Patented Nov. 22, 1938

2,137,969

UNITED STATES PATENT OFFICE 2,137,969

ARTICLE OF MANUFACTURE

Raymond Einnon Thomas, Newburgh, N. Y., assignor to E. I. du Pont de Nemours & Company, Wilmington, Del., a corporation of Delaware No Drawing. Application April 2, 1937, Serial No. 134,579

6 Claims. (Cl. 91—68)

This invention relates to plasters, also called pressure-sensitive adhesive tapes, having cleanable embossed backings.

In United States Patent 1,877,344 issued September 13, 1932, there is disclosed a plaster consisting of a woven cotton fabric having on one side a cellulose nitrate lacquer coating and on the other side a pressure-sensitive adhesive film. Plasters or adhesive tapes of this character are probably superior to the previously known adhesive tapes (consisting merely of untreated fabric having a pressure-sensitive adhesive layer spread thereon) in that they may possibly be made non-soiling and capable of washing without undesirable deterioration. It has been found that the suggested widened utility and serviceableness of such a product are not of themselves capable of making the same a commercial success. In order to make a plaster having a waterproof coating for general use saleable, it is necessary to enhance the appearance.

Experience has shown that satisfactory improvement in appearance may be obtained by embossing. Surprising as it may seem, satisfactory anchorage of the pressure-sensitive rubber adhesive layer is not obtained when a pressure-sensitive rubber adhesive is spread on the fabric side of the coated and embossed backing in accordance with current commercial practice. In fact, there is so little adhesion between the backing and adhesive that the adhesive never satisfactorily attaches itself to the backing.

It is not unlikely that some change in coating apparatus or method might enable a manufacturer to secure a coated tape of proper qualities, but coating practice and apparatus are so thoroughly standardized that any change therein is not commercially practical.

This invention has for an object the preparation of embossed, non-soiling, washable plaster having on its under side a securely anchored pressure-sensitive adhesive. Another object was the preparation of a cleanable adhesive tape consisting of a cotton fabric having on one side an embossed water-proof cellulose nitrate coating, and securely anchored to the other side a pressure-sensitive rubber adhesive. Still another object was the preparation of a plaster comprising a fabric treated to render it water-repellent, having an embossed non-soiling, washable cellulose derivative coating on one side and a satisfactorily anchored pressure-sensitive adhesive on the other side. A general advance in the art, and other objects which will appear hereinafter, are also contemplated.

It has now been found that the detrimental effects of embossisg so far as anchorage of a pressure-sensitive adhesive to a coated fabric is concerned, may be overcome by subjecting the embossed product to an aqueous treatment followed by drying under suitable conditions, for example, in a tenter frame.

The foregoing objects and related ends are accomplished in the manner set out in the following description and illustrative specific examples, in which are disclosed details of what is believed to be the best mode for carrying out the invention. Quantities are given in parts by weight throughout the application unless otherwise indicated.

Example I

A plain weave cotton fabric weighing approximately 3.78 ounces per linear yard 40 inches wide and having a yarn count of 80 x 80 which had been bleached by conventional methods, was coated on one face by means of a doctor knife with a plurality of coats of a composition consisting of:

| | Per cent |
|---|---|
| Cellulose nitrate | 12.6 |
| Ethyl alcohol | 36.0 |
| Ethyl acetate | 24.0 |
| Ethylene glycol monoethyl ether phthalate | 14.0 |
| Lithopone | 13.4 |

These materials were compounded by stirring the pigment and plasticizer into a dispersion of the cellulose nitrate in the organic liquids. The cellulose nitrate had a nitrogen content of 12.3–12.5% and a viscosity characteristic of between 90 and 110 seconds, as determined by the A. S. T. M.—D301–33 method described below. When the coating was complete, it was found that there had been deposited approximately 4 ounces of coating composition (excluding volatile solvent) per linear yard of 39 inches width. In carrying out the coating just described, the material after each successive coat was passed through a heated chamber to remove the volatile solvents. The resulting pyroxylin coated fabric was then embossed in the conventional manner by pressing it between a heated steel embossing plate and a fibrous (felt) material embossing bed. Similar material has been produced by embossing with a steel embossing roller and a fibrous (laminated paper) bowl.

Example II

A portion of the material produced according to Example I was passed through a water bath at such a speed that a thorough wetting out of the fibers of the coated fabric was obtained.

After the wetting out of the coated fabric, the material was dried in a tenter frame under substantially little or no tension.

*Example III*

A portion of the material obtained according to Example II was coated immediately on the fabric side with a pressure-sensitive rubber adhesive mass of the following composition:

| | Per cent |
|---|---|
| Indian rubber (cut fine) | 8.1 |
| Rosin | 7.7 |
| Zinc oxide | 12.1 |
| Wool fat | 12.1 |
| Benzene | 60.0 |

In preparing this adhesive mass the rubber was mixed with benzene in the ratio of 14.3 parts of the former to 85.7 parts of the latter. The mixing was continued until a uniform colloidal solution was produced. The rosin was dissolved in an equal amount of benzene and strained. The zinc oxide was dried at 100° C. and then mixed with the benzene in the ratio of 73.4 parts of the zinc oxide to 26.6 parts of the benzene until a thick paste was formed. The wool fat was incorporated in the zinc oxide paste. The zinc oxide paste containing the wool fat, the rosin solution and the rubber solution were then thoroughly mixed, whereupon the mass was set aside for a few hours before spreading on a cotton fabric base. The finished material was then cut into strips which were wound into rolls.

*Example IV*

A portion of the material obtained according to Example II was stored for several months and then coated on the fabric side with a pressure-sensitive rubber adhesive mass of the following composition:

| | Per cent |
|---|---|
| Caoutchouc | 10.0 |
| Zinc oxide | 5.0 |
| Mineral oil | 35.0 |
| Benzene | 50.0 |

The caoutchouc was mixed with the benzene until thoroughly dissolved. The zinc oxide was dried as in Example III and then mixed with the mineral oil to form a thick paste or cream. The caoutchouc solution and the zinc oxide paste were thoroughly mixed before spreading on the fabric.

*Example V*

A portion of the product obtained according to Example I was placed in a closed chamber and exposed to a moisture-saturated atmosphere until the exposed fabric was completely saturated with moisture. It was thereafter removed and dried in a tenter frame under such conditions that the embossed fabric was subject to very little, if any, tension. The dried, embossed material was then coated with a layer of conventional pressure-sensitive rubber adhesive by passing under a doctor knife at elevated temperatures. The resulting adhesive plaster was cut into strips and rolled in the manner customarily employed in marketing materials of this character.

*Example VI*

A portion of the material obtained according to Example I was passed through a bath consisting of 75 gallons of water and 25 pounds of an emulsion of paraffin wax in an aqueous solution of aluminum acetate until thoroughly impregnated. This emulsion was prepared in accordance with Example 9 of United States Patent 2,047,217 issued July 14, 1936, and was maintained at 170° C. during the wetting-out process. The impregnated embossed fabric was then dried in a tenter frame with as little tension as possible. After drying, a pressure-sensitive adhesive mass was spread on the fabric side in a conventional manner. The finished material was then rolled into rolls and stored for several months. At the end of the storage period the material was unrolled, and it was found that the pressure-sensitive adhesive was still satisfactorily anchored to the coated and impregnated backing.

*Example VII*

A bleached plain weave cotton fabric weighing approximately 1.89 ounces per linear yard 20 inches wide and having a yarn count of 80 x 80, was thoroughly impregnated by passing through a bath prepared according to Example 13 of United States Patent 2,047,217. The impregnated material was then dried and coated with a cellulose nitrate lacquer. The lacquer used for coating was prepared by dispersing cellulose nitrate in a mixture of 40% ethyl acetate and 60% denatured ethyl alcohol (2B-Formula) in the ratio of 24 ounces of cellulose nitrate for each gallon of dispersing medium, and mixing into the resultant dispersion dibutyl phthalate and lithopone so that the lacquer had the following composition:

| | Per cent by weight |
|---|---|
| Cellulose nitrate dispersion | 72.6 |
| Dibutyl phthalate | 14.0 |
| Lithopone | 13.4 |

The cellulose nitrate used had a nitrogen content of 12.3–12.4% and a viscosity characteristic of between 90 and 110 seconds. The viscosity characteristic was determined by the A. S. T. M.—D 301-33 method.

The A. S. T. M.—D 301-33 method of determining viscosity is the time required for a $\frac{1}{8}''$ steel sphere to fall 10'' through a column of solution one inch in diameter, the said solution consisting of:

| | Per cent |
|---|---|
| Cellulose nitrate | 12.2 |
| Denatured alcohol (2B Formula) | 22.0 |
| Toluol | 48.3 |
| 85% ethyl acetate | 17.5 |

The determination is carried out at 25° C.

The coating was applied in a plurality of layers so that the final product had approximately 2 ounces per linear yard of 20 inch width finished material. Each layer of the coating had the solvents removed by passing through a heated chamber before the next succeeding coat was applied.

The finished coated material was embossed by passing between a heated metal embossing roller and a fiber supporting roller. The embossed coated material was thoroughly wetted by steeping the same in a tank of water. It was removed and dried in a tenter frame under substantially no tension. When dry, an ordinary pressure-sensitive rubber adhesive was spread on the uncoated side by means of conventional calender rolls operating at elevated temperatures. The finished material was then cut into small sheets and stacked one upon the other for packaging.

Example VIII

A plain weave cotton fabric weighing approximately 3.78 ounces per linear yard 40 inches wide and having a yarn count of 80 x 80 was bleached by conventional methods employing hydrogen peroxide, and then impregnated with a composition consisting of:

| | Per cent |
|---|---|
| Cellulose nitrate | 3.05 |
| Ethyl acetate | 22.07 |
| Ethyl alcohol | 33.10 |
| Toluol | 28.70 |
| Dibutyl phthalate | 6.03 |
| Ceresin wax | 4.05 |
| Paraffin oil | 3.00 | by applying the coating to both sides with a doctor knife. The saturated material was passed over heated coils to remove the volatile solvents. The resultant sheet material was then coated with a composition consisting of:

| | Per cent |
|---|---|
| Cellulose nitrate | 10.0 |
| Dibutyl phthalate | 12.0 |
| Zinc oxide | 29.2 |
| Denatured alcohol (2—B) | 29.3 |
| 99% ethyl acetate | 19.5 |

The cellulose nitrate was the same as that used in Example I. When the last layer of coating material had been applied and the solvent removed, the product was embossed by pressing between a metal embossing roller and a felt embossing support. The embossed material was then festooned in a closed chamber and subjected to a water-saturated atmosphere for a period of time sufficient to allow thorough penetration of the fabric by the water present. The wet product was removed and dried in a tenter frame in the conventional manner, care being taken that no substantial tension was allowed to develop. After drying, a pressure-sensitive rubber adhesive was applied in the manner heretofore described and the resulting sheet material slit into strips and the strips rolled on spools in the well known manner.

The invention is not limited to the particular fabrics mentioned in the examples. In place of the plain or sheeting weave, having a yarn count of warp 80 filler 80, other fabrics, for example, felt, broadcloth fabrics or the like, may be used. While plain weave fabrics are preferred, special weave fabrics such as pajama check, have definite advantages under certain conditions. The choice of the fabric used, whether woven or unwoven, is determined largely by the use to which the material is to be put, and it may be readily selected by those skilled in the art. Certain types of paper may be advantageously treated by the processes described above.

The invention is not limited to the particular water-proofing coating compositions mentioned in the examples. Other types of cellulose nitrate have been found satisfactory. Nitrates having a viscosity characteristic below 90 and above 110 seconds are applicable to specific needs. The nitrogen content may vary within wide limits. A choice of the particular cellulose nitrate may be easily made by those skilled in the art, after a consideration of the specific purpose to which the plaster is to be put. Under such circumstances, the use of varying proportions of other cellulose derivatives, such as cellulose acetate, mixed cellulose acetate-propionate and the like is not precluded.

Other white pigments than lithopone, such as titanium oxide, "Titanox" (barium base), "Titanox" (calcium base), zinc oxide and the like may be used with satisfactory results. Colored pigments, such as chrome yellow, chrome green, red oxide, ultramarine blue and the like, may be used alone or mixed to produce solid colors, or may be used in conjunction with white pigments to produce tints, if desired. The choice of pigments depends upon the desired color of waterproof coating. Pigments which contain copper or manganese are ordinarily avoided since these elements have a deleterious effect on the rubber in the pressure-sensitive adhesive.

The solvent or dispersing medium used in preparing the waterproof coating composition may vary according to practices well known in the art. Because of the character of the product made by this invention, very pure materials especially free from impurities are preferable. Other alcohols, such as methyl, propyl, butyl and the like, and other esters such as butyl acetate, iso-propyl acetate, amyl acetate and the like, may be used where desired, in accordance with well known compounding principles.

Denatured alcohol corresponding to the 2—B formula of the Internal Revenue Bureau, consists of a mixture of ethyl alcohol and benzene in the ratio of one-half gallon of benzene for each 100 gallons of 95% (by volume) of ethyl alcohol.

Quite a number of plasticizers or softeners are suitable for use in this invention. Specific mention may be made of benzyl butyl phthalate, diethylene glycol monoethyl ether phthalate, ethylene glycol monoethyl ether phthalate, dicyclohexyl phthalate, glycol isobutyl phthalate, hexahydrobenzyl phthalate, ethylene glycol monomethyl ether phthalate, methyl cyclohexyl phthalate, the phthalates of higher alcohols boiling above 133° C., linseed oil modified glycerol phthalate, dibutyl tartrate, dibutoxy ethyl tartrate, resinous products obtained from the reaction of glycerols and the poly-glycerols and dibasic acids from the group comprising sebacic, pimelic, suberic, azelaic and adipic acids, acetylated hydrogenated castor oil, phenol formaldehyde resins, urea resins, aromatic phosphates as tricresyl phosphate, camphor and the like.

The percentage of softener in the composition depends upon the other ingredients of the composition and the physical properties of the particular softener. The preferred range is from 12% to 19% with a corresponding pigment range of 11% to 16%. In the case of ethylene glycol monoethyl ether phthalate, the range 12% to 19% is particularly advantageous. Variations in the amount of softener may be dictated by practical needs and may be readily determined empirically.

It has been found particularly advantageous to use materials in the film forming composition as free from impurities as practical. For example, it is preferred to use so-called virgin cellulose nitrate, solvents or dispersing media which have not previously been used or which have in their rectification been freed from all impurities, and good quality pigments. The softeners should also be of the highest order of purity so as to guard against the introduction of any impurities which might have a deleterious action on the adhesive rubber mass or the human body with which it may come in contact.

The amount of the composition applied to produce the water-proof and washable film may vary over limits, and is guided largely by the type of finished product desired and general practical and economic considerations. A variation of from 1 to 10 ounces per linear yard 39 inches width finished material has been found to be the most practical, although greater or lesser amounts may be used as required.

In the modification of the invention where a water-repellent coating is applied to the fabric, considerable variation is permissible. The application of various metallic soap treatments (such as aluminum soaps and the like), and various salt solutions (such as aluminum acetate and the like) confer desirable water-repellent properties to the fabric. The compositions mentioned in United States Patent 2,047,217 are especially suitable. Any convenient type of impregnating equipment such as a die, jig, a padder, doctor knife equipment and the like may be used. A cellulose derivative wax composition such as that utilized in Example VIII is preferably applied by means of a suitable doctor knife or roller either to one or both sides of the fabric, due precautions being taken to secure sufficient penetration to saturate the material. The volatile solvent or solvents in such compositions like the solvents in the waterproofing coating composition, may be removed by various known expedients such as passing the treated fabric through heated chambers or over heated coils or rolls, as is well known in the coating art.

The embossing employed in accordance with this invention is conventional, in that known equipment and mechanical processes are utilized. It has been found that advantages some times accrue from covering the matrix of the embossing element with a cotton fabric prior to the actual embossing operation. The advantages which result are attributed to the utilization of a more resilient surface.

Pressure-sensitive adhesives are well known in the art, and the invention is not limited to the specific compositions mentioned earlier in this specification. The adhesive mass should be free from nodules, and should contain approximately 20% pure rubber, based on the non-volatile components of the spreading mass. If zinc oxide is used as the filler it should constitute approximately 10% to 30% of the non-volatile components of the adhesive mass. The volatile solvent or dispersing medium content of the adhesive mass may vary over a wide range, depending upon the type of apparatus used for spreading. A solvent content of 40% to 50% has been found satisfactory. The solvent may be omitted entirely and the mass compounded to a consistency suitable for application by calendering methods. Each manufacturer of pressure-sensitive adhesives has specific formulae which they regard as superior to those of their competitor. Examples of such compositions and their mode of application are disclosed in "The Chemical Formulary" by Bennett, volume 2, page 366, D. Van Nostrand Co., New York (1935), and "The Pharmacopoeia of the United States of America"—Eleventh Decennial Revision, Mack Printing Company (1936).

The invention has many advantages, among which may be mentioned the production of a water-proof, non-soiling, cleanable adhesive tape having a securely anchored pressure-sensitive adhesive.

As many apparently widely different embodiments of this invention may be made without departing from the spirit and scope thereof, it is to be understood that I do not limit myself to the specific embodiments thereof except as defined in the appended claims.

I claim:

1. The process which comprises coating one side of a fabric with a water-proof coating composition, embossing the coated fabric, wetting out the embossed coated fabric, drying the wetted-out embossed coated fabric in the absence of substantial tension in an unwrinkled form and coating the uncoated side of the dry wetted-out embossed coated fabric with a pressure-sensitive adhesive.

2. The process of claim 1 in which the said waterproof coating composition contains a cellulose derivative.

3. Process of claim 1 in which the said waterproof coating composition has approximately the following formula:

| | Per cent |
|---|---|
| Cellulose nitrate | 12.6 |
| Ethyl alcohol | 36.0 |
| Ethyl acetate | 24.0 |
| Ethylene glycol monoethyl ether phthalate | 14.0 |
| Lithopone | 13.4 |

4. Process of claim 1 in which the said waterproof coating composition contains a cellulose derivative and the pressure sensitive adhesive has approximately the following formula:

| | Per cent |
|---|---|
| India rubber | 8.1 |
| Rosin | 7.7 |
| Zinc oxide | 12.1 |
| Wool fat | 12.1 |
| Benzene | 60.0 |

5. Process of claim 1 in which the said waterproof coating composition contains a cellulose derivative and the pressure sensitive adhesive has approximately the following formula:

| | Per cent |
|---|---|
| Caoutchouc | 10.0 |
| Zinc oxide | 5.0 |
| Mineral oil | 35.0 |
| Benzene | 50.0 |

6. Process of claim 1 in which the said waterproof coating composition contains cellulose nitrate and a solvent plasticizer and the pressure sensitive adhesive contains rubber, said solvent plasticizer having no deleterious effect on the said pressure sensitive adhesive.

RAYMOND EINNON THOMAS.